United States Patent [19]

English et al.

[11] 4,020,911

[45] May 3, 1977

[54] LOAD CELL SCALE

[75] Inventors: David C. English, Seattle; Jerry L. McCauley, Renton; Godfrey A. Holmstrom, Issaquah, all of Wash.

[73] Assignee: Structural Instrumentation, Inc., Tukwila, Wash.

[22] Filed: June 14, 1974

[21] Appl. No.: 479,474

Related U.S. Application Data

[63] Continuation of Ser. No. 387,502, Aug. 10, 1973, abandoned, which is a continuation of Ser. No. 268,664, July 3, 1972, abandoned.

[52] U.S. Cl. .............................. 177/136; 177/211; 73/141 A
[51] Int. Cl.² ...................................... G01G 19/08
[58] Field of Search ......... 177/136, 211; 73/141 R, 73/141 A

[56] References Cited

UNITED STATES PATENTS

| 2,848,892 | 8/1958 | Hoffman | 73/141 A |
|---|---|---|---|
| 2,920,480 | 1/1960 | Haas | 73/141 R |
| 3,159,227 | 12/1964 | Raskin | 177/211 |
| 3,283,838 | 11/1966 | Fetterman | 177/211 |
| 3,363,456 | 1/1968 | Laimins | 73/141 A |
| 3,365,689 | 1/1968 | Kutsay | 73/141 A |
| 3,433,063 | 3/1969 | Ten Cate | 73/141 A |
| 3,439,761 | 7/1969 | Laimins | 172/211 |
| 3,446,298 | 5/1969 | Cort | 177/211 |
| 3,495,453 | 2/1970 | Angelo | 73/141 A |
| 3,603,418 | 9/1971 | Schmidt | 177/211 |
| 3,661,220 | 5/1972 | Harris | 177/136 |
| 3,734,216 | 5/1973 | Nordstrom | 177/211 |
| 3,771,359 | 11/1973 | Shoberg | 73/141 A |
| 3,780,817 | 12/1973 | Videon | 177/136 |

FOREIGN PATENTS OR APPLICATIONS

| 1,147,411 | 4/1963 | Germany | 73/141 A |
|---|---|---|---|
| 2,015,420 | 12/1970 | Germany | 177/136 |

*Primary Examiner*—L. T. Hix
*Assistant Examiner*—Vit W. Miska
*Attorney, Agent, or Firm*—Seed, Berry, Vernon & Baynham

[57] ABSTRACT

Several load cell fixed beams transmit the weight of the useful load of a truck or a scale device from the useful load support to the base structure, such as a truck chassis, or a trailer chassis. The load cell fixed beam carries two compression sensitive strain gauges and two tension sensitive strain gauges connected in a Wheatstone bridge circuit to actuate a digital display. An amplifier or a variable gain amplifier can be provided to intensify the bridge circuit signal. Calibration controls can be provided for setting the readout of the useful load to zero, and further controls can alter the sensitivity of the circuitry to alter the ratio between useful weight and readout.

2 Claims, 10 Drawing Figures

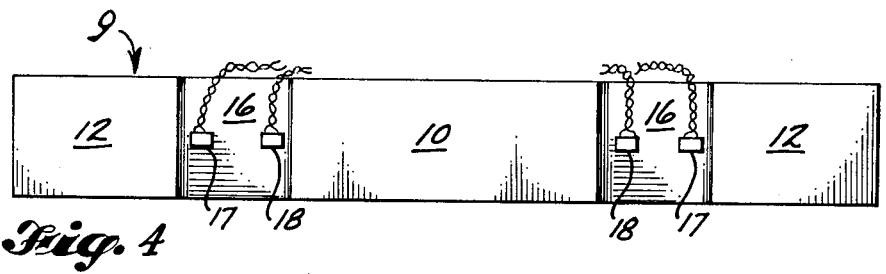
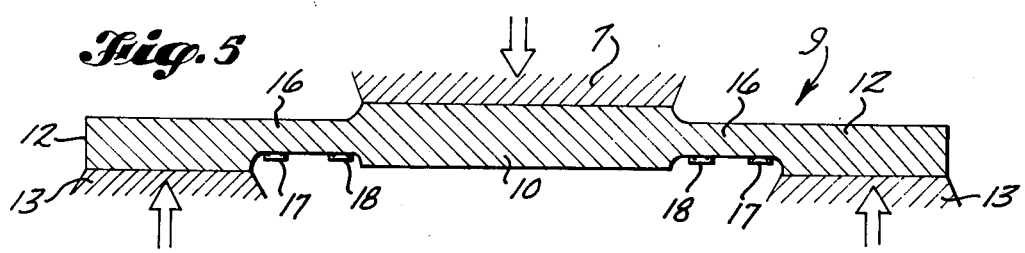
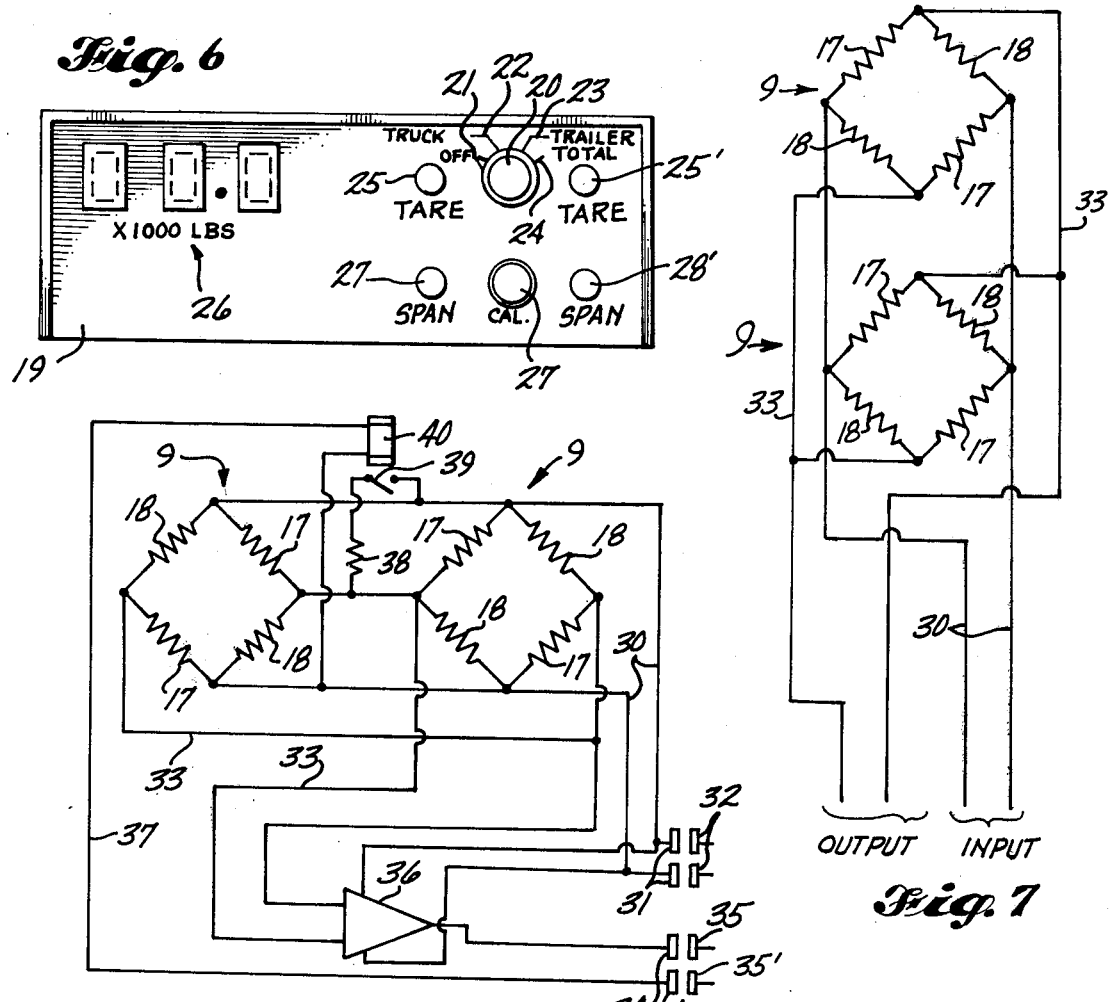

LOAD CELL SCALE

This is a continuation of application Ser. No. 387,502, filed Aug. 10, 1973, now abandoned, which is a continuation of application Ser. No. 268,664, filed July 3, 1972, now abandoned.

The present invention relates to load cell scales, particularly of the type in which the useful load is supported by load cell beams.

A principal object of the invention is to provide a scale having load cell beam supports which can be constructed sufficiently strong to carry very heavy loads, but which can be sufficiently limber so as to respond reliably to relatively small changes in load on the scale.

A further object is to provide a type of load cell beam which will produce a strong signal reflecting a change in load on the beam in response to a small change in such load.

It is also an object to provide circuitry for load cells which will enable the initial calibration of a load cell or load cells to be altered at the will of the operator, and to provide ample amplification of a signal responsive to a change in load to enable the load change to be detected and indicated accurately.

Another object is to provide mechanism for controlling load cell circuitry to alter its sensitivity so that the scale of a readout corresponding to a weight change can be altered for a given weight change.

FIG. 4 is a horizontal section taken on line 4—4 of FIG. 2.

FIG. 5 is a somewhat diagrammatic vertical section taken on line 5—5 of FIG. 3.

FIG. 6 is a front elevation of a load-indicating and scale control unit.

FIG. 7 is a load cell strain gauge circuit diagram for a truck load indicating device, and FIG. 8 is a load cell strain gauge circuit diagram for a trailer load indicating device.

Figure 1:
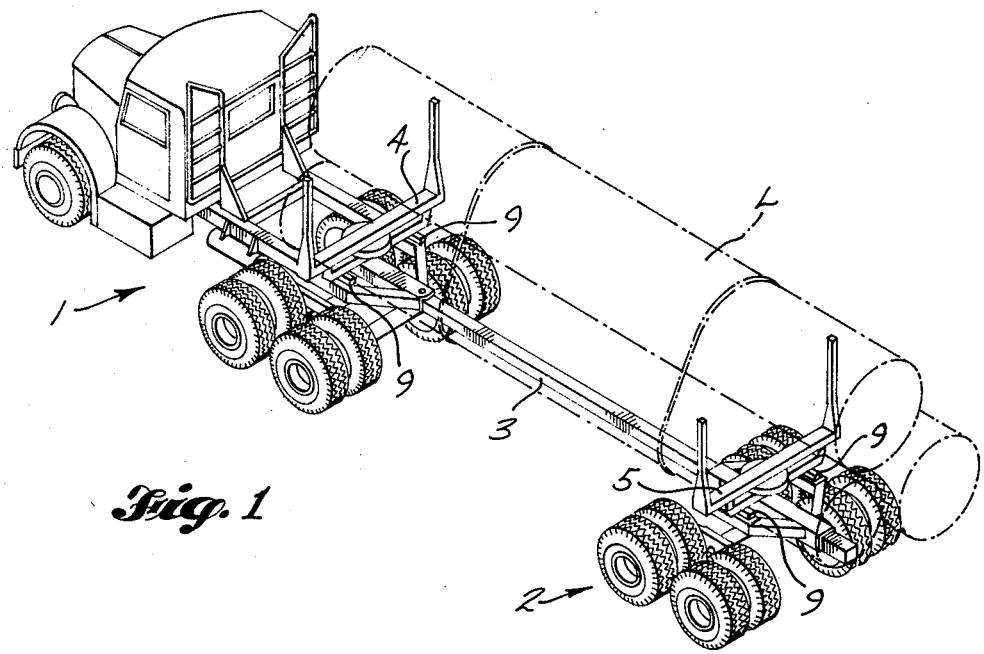
FIG. 1 is a top perspective of a logging truck and trailer combination incorporating the present invention.
Figure 2:
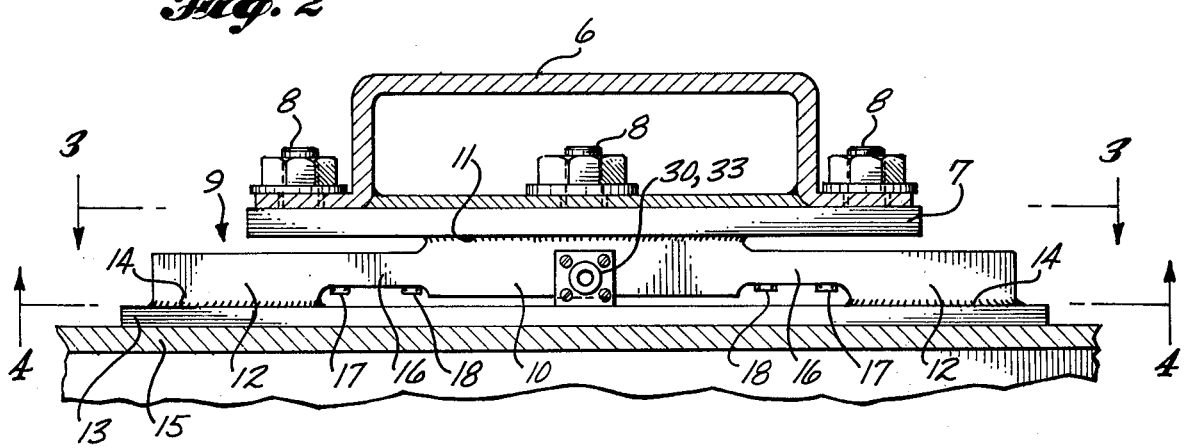
FIG. 2 is a detail section through a portion of the load-supporting structure showing a load cell beam in elevation.
Figure 3:
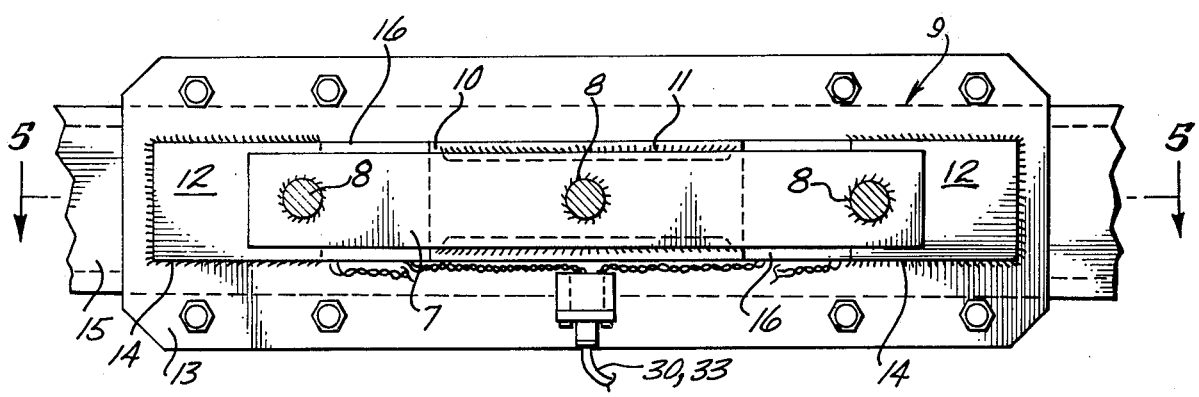
FIG. 3 is a horizontal section taken on line 3—3 of FIG. 2.

The two applications of the present invention described below, namely, a logging truck and trailer, and a scalepan type of scale are illustrative of the variety of applications for which the present invention is suitable.

In the past, it has been difficult to determine quickly and accurately the useful load carried by a truck and/or a trailer. Large and expensive platform scales have been provided at special locations onto which a truck or a truck and trailer combination can be driven; but when a loaded truck or a truck and trailer has arrived at such a weighing station, it is usually impractical to alter the load of the truck or truck and trailer. By use of the present invention, the useful load on a truck or a truck and trailer combination can be monitored while such truck or combination is being loaded, and the load can be increased or decreased as may be necessary to establish the desired load.

In the combination of a logging truck 1 and a logging trailer 2 connected by the longitudinal beam 3, the useful load of the logs L is supported by a bunk 4 on the truck and a bunk 5 on the trailer. In each case, the bunk is supported by a crossbeam 6, the opposite end portions of which are secured to a crossbeam support plate 7 by bolts 8. Each of such support plates transmits the weight of the load of logs L to a load cell beam 9.

Each load cell beam 9 includes a thick central portion 10 which is secured integrally to its support plate 7 by welding 11, and two thick end portions 12. Such end portions are secured integrally to a load cell support plate 13 over a considerable distance lengthwise of the load cell beam by welding 14. The load cell support plate 13, in turn, is carried by a side member 15 of the truck or trailer frame.

The opposite ends of the thick central portion 10 of the load cell are connected, respectively, to the thick fixed end portions 12 of the load cell by reduced thickness sections 16, which are of substantially less thickness than the thickness of the central section 10 of the load cell beam. Consequently, when downward load is applied to the support plate 7 by useful load on the truck transmitted through the crossbeam 6, the central section 10 will be depressed to an extent corresponding to the load so that the reduced thickness deflection sections 16 will be bent.

Because the end sections 12 are fixed, each section 16 will be deflected in an ogee curve, so that the portion of the lower surface of each section 16 adjacent to an end section 12 will be compressed, and the portion of the lower surface of each section 16 adjacent to the central section 10 will be stretched. In order to indicate the change in the surface length, strain gauges 17 and 18 are mounted on the lower surface of the deflection sections in spaced relationship, so that one strain gauge 17, adjacent to a fixed end portion 12 of a load cell beam, will sense contraction and the other strain gauge 18, adjacent to the central portion 10 of the load cell beam, will sense extension.

As indicated in FIG. 1, in order to be able to indicate the weight of a load of logs L on the combination of a truck 1 and a trailer 2, the weight of such log load is transmitted to the truck and trailer through four load cell beams 9, which are located two on the truck and two on the trailer. The strain gauges of these load cells are connected in circuits, such as shown in FIGS. 7 and 8, which will produce a signal in the readout of the load indicator and control panel 19 shown in FIG. 6. The mechanism shown in FIGS. 6, 7 and 8 is arranged so that separate readings can be obtained for the portion of the useful load weight supplied to the truck 1, and to the trailer 2.

Control knob 20 mounted on the panel 19 is rotatable to position its pointer in registration with the designation "OFF" 21, or in registration with the "TRUCK" index 22, or in registration with the "TRAILER" index 23, or in registration with the "TOTAL" index 24. When the pointer of knob 20 is in the OFF position 21, the readout 26 of panel 19 will not indicate any load. When the pointer of such knob is in registration with the TRUCK index 22, the readout will indicate a reading corresponding to the load on truck 1, which load influences the circuit of FIG. 7. When the pointer of knob 20 is in registration with the TRAILER index 23, the readout 26 will reflect the load on the trailer 2, which load influences the circuit of FIG. 8. When the pointer of knob 20 is in registration with the TOTAL index 24 the combined useful load of the truck and trailer will be shown by the readout 26.

The readout and control panel 19 carries additional controls for the circuits that actuate the mechanism for operating the readout 26. In order to calibrate the readout 26, when the pointer of knob 20 is in registration with TRUCK index 22, a "TARE" knob 25 can be set so that the readout 26 reads zero, thus disregarding the tare weight of the truck. When the pointer of knob 20 is in registration with the TRAILER index 23, a "TARE" knob 25' can be set so that the readout 26 reads zero, thus disregarding the tare weight of the trailer. In addition, the span or range of the readings can be set by pushing the switch button 27, turning the "SPAN" knob 28 to the desired known reference weight for the truck, and turning SPAN knob 28' to select the desired known reference weight for the trailer. The load cell circuits are connected to the circuitry of the readout panel 19.

The circuit shown in FIG. 7 includes a suitable arrangement for the strain gauge carried by the load cell beams of the two load cells 9 mounted on truck 1. The strain gauges of each load cell are connected in a Wheatstone bridge circuit. The convolutions of the two contraction strain gauges 17 form two opposite arms of the bridge circuit, and the two extension strain gauges 18 form the other two opposite arms of the bridge circuit. The two bridge circuits are connected in parallel, and the current input leads 30 and the output leads 33 are connected to the circuitry of the readout panel 19.

In the trailer circuit of FIG. 8, the Wheatstone bridges 9 for the respective load cell strain gauges will again be connected in parallel to the input leads 30 and to the output leads 33. The input leads connect opposite bridge arm points with input connector contacts 31. These contacts receive electric current from contacts 32. The output leads 33 extend from the other arm points of the bridges to an amplifier 36 which has a single output connection to the output terminal 34. This amplifier provides a low impedance voltage source to the connector. Such amplifier also increases the signal-to-noise ratio and isolates the plus and minus power leads 30 from the signal lead 34 of the connector. Such amplifier minimizes the effect on the bridge output signal of moisture or dirt on the connector which might affect the output reading.

In FIG. 8 the span-setting circuit is shown. Instead of output from the Wheatstone bridges being impressed on the output connection contact 34, one of the output leads 33 of the bridge circuits is connected to the calibrating fixed resistor 38 of predetermined reference value by switch 39 closed by relay 40 connected between an input lead 30 and a lead 37 connected to a contact 34'. Such relay is energized by closing calibration switch 26. Obtaining a predetermined reading by closing of the switch will verify that all cables and connectors and load cells are in proper working condition.

Contacts 34 and 34' can be engaged with output contacts 35 and 35' which, in turn, are connected to the circuitry of the readout panel 19. The connector 29 will have the contacts 31, 34 and 34' arranged in one part, and the contacts 32, 35 and 35' arranged in another part, which are interconnectable in a manner to insure that the load cell contacts and the control panel contacts will be connected properly.

In operation, first the knob 20 is turned from the OFF index line 21 to the TRUCK index line 22. The TARE knob 25 is then turned when the truck is not loaded until the readout indicates zero weight, thus setting the readout 26 to disregard the tare weight of the truck. Next, a predetermined calibrating value of the useful load proportion to be imposed on the truck 1 is determined. The calibrating value should be verified as corresponding to actual weight by adjusting the knob 28 when the loaded truck is on a scale until the readout 26 indicates the corresponding weight. Then the switch 27 should be closed to ascertain the predetermined calibrating value for the truck. Whenever the calibration switch 27 is closed thereafter, showing of the predetermined reading on readout 26 will indicate that the equipment is in proper working order.

Next, the knob 20 would be turned from the TRUCK index mark 22 to the TRAILER index mark 23. The TARE knob 25' would then be turned when the trailer is not loaded until the readout indicates zero weight, representing the tare weight of the trailer and no useful load, thus setting the readout 26 to disregard the tare weight of the trailer. Span knob 28' is turned when the loaded trailer is on a scale until the readout indicates the correct useful weight of the load on the trailer. The calibration switch 27 is then closed to ascertain the proper predetermined calibrating value for the trailer. The apparatus is then ready for use.

When the load of logs appears to be approximately that required, the knob 20 is turned to the TOTAL index 24 and a reading taken of the total load on the truck and trailer. The knob is then turned to index 22 and then to index 23 and a reading taken on each to be sure that the load on the truck and on the trailer separately do not exceed allowable values. These two readings added together should equal the total load reading. If one reading is higher than permissible, but the total is within the legal limits, the logs can be shifted longitudinally to adjust the portions of the load on the truck and trailer appropriately.

Figure 9:
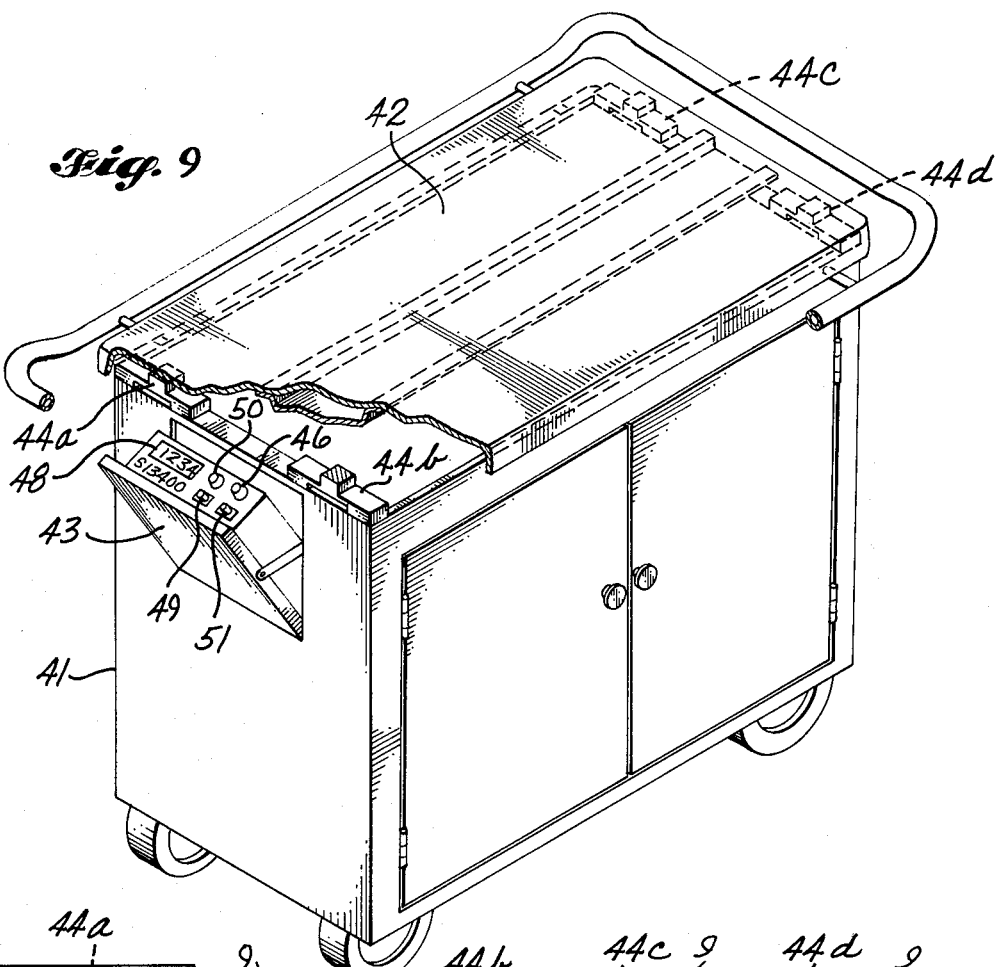
FIG. 9 is a top perspective of a scalepan type of beam load cell scale.
Figure 10:
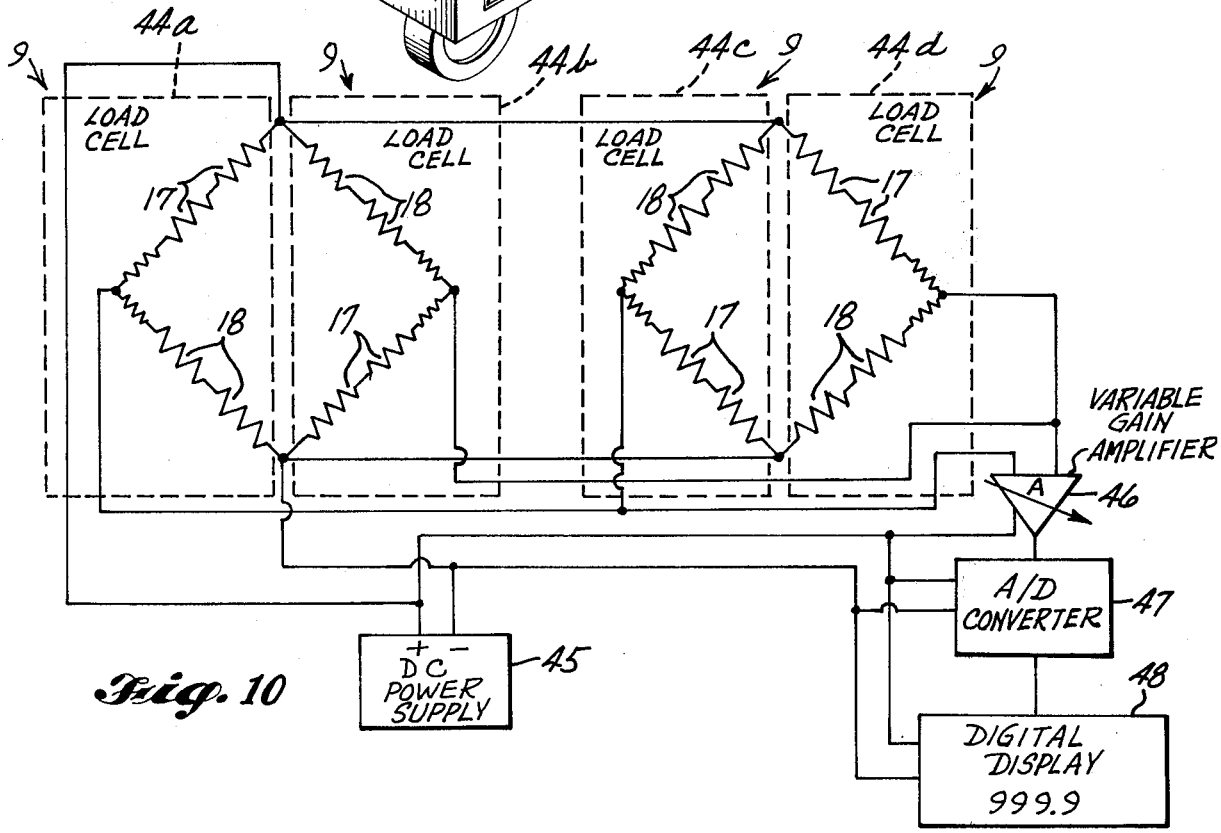
FIG. 10 is a diagram of a load cell strain gauge circuit for such a scale.

In FIGS. 9 and 10, a special scalepan type of scale is shown, in which the scalepan is supported by a plurality of load cells of the fixed beam type. Such a scale can be used as a weight indicating device or, alternatively, can be adjusted to read out dimensionless numbers useful for designating numbers of like parts such as in taking inventory. Such a scale may therefore be designated a ratiometer.

The scalepan may be mounted on a base 41 entirely covered by a scalepan 42. The circuitry of the scale can be incorporated in a chassis 43 tiltably mounted in one end of the base 41. The scalepan 42 is supported from the base 41 solely by four fixed beam load cells 44a, 44b, 44c and 44d, located beneath the four corner portions of the scalepan. Each of these load cells can be of the same general construction as the load cells 9, shown in FIGS. 2 to 5, inclusive. The strain gauges of such load cells are shown connected in a Wheatstone bridge circuit in FIG. 10.

Each Wheatstone bridge circuit includes the strain gauges of two load cells. In the circuit diagram of FIG. 10, the contraction strain gauges 17 and the extension strain gauges 18 of the two load cells 44a and 44b supporting one end of the scalepan 42 are shown as being connected in one bridge circuit, and the contraction strain gauges 17 and the extension strain gauges 18 of the load cells 44c and 44d supporting the other end of the scalepan 42 are incorporated in the other bridge circuit. The input leads of both bridge circuits are connected to the direct current power supply 45 and the output leads of both bridge circuits are connected to the variable gain amplifier 46.

The output amplifier 46 is connected to the analog-to-digital converter 47 to convert the analog signal to a digital pulse which will actuate the readout display 48. By adjusting the amplifier 46, the span of the readout 48 can be altered appropriately, so that the number indicated will be the number of identical weight objects placed on the scalepan 42 instead of indicating the weight of objects on the scalepan in pounds. If it were desired to have the readout indicate pounds, however, the calibration momentary contact switch 51 can be pressed to closed position for substituting a predetermined fixed resistance for the bridge circuit, and the knob 46 can be turned until the readout indicates 100 pounds, for example.

We claim:

1. A system for measuring the weight of a load carried by a truck having planar load supporting members above opposing planar portions on the underlying frame of the truck,
   load cells positioned between said load supporting members and planar portions and being operatively connected to weight indicating means for providing an indication of the sum of the individual loads carried by said load cells, each of said load cells comprising:
   a single, elongated, rectangular measurement beam having two end portions separated from a central portion by respective, relatively thin intervening portions, said end portions being relatively thick and projecting below the central and intervening portions of said beam such that said central and intervening portions can deflect downwardly when said end portions are supported on a planar surface and a load is applied to said central portion, and said central portion being relatively thick and projecting above the end and intervening portions of said beam with the top surface of said central portion being welded to a respective said planar load supporting member thereby spacing said planar load supporting member above the end portions of said beam such that said load supporting member does not contact said end portions when said central and intervening portions of said beam deflect downwardly responsive to a load applied to the central portion of said beam;
   an elongated, planar support plate extending beneath said beam from one end portion to the other end portion, said beam having its lower surface contacting the respective planar portion of said underlying frame and its upper surface contacting the lower surface of said beam end portions, said end portions being welded to said support plate so that said measurement beam constitutes a fixed ended beam forming an S-shaped curve upon deflection; and
   a pair of strain gauges secured to the underside of each intervening portion of said beam, said strain gauges being spaced apart from each other such that as the center portion of said beam deflects, the portion of said beam contacting one strain gauge undergoes compression while the portion of said beam contacting the other strain gauge undergoes tension.

2. The system of claim 1, wherein said truck is a logging truck with log supporting bunks and said support plates are secured to the frame of the truck at locations spaced beneath respective ends of said bunks, and the central portions of said measurement beams are welded to respective planar support plates which are bolted at the underside of said bunks, the axes of said measurement beams extending along the longitudinal axis of said truck such that said load cells effectively restrain shifting of said load responsive to forces exerted on said bunks in a longitudinal direction.

* * * * *